United States Patent
Thoen (10) Patent No.: US 9,703,632 B2
(45) Date of Patent: Jul. 11, 2017

(54) SLEEP MODE OPERATION FOR VOLATILE MEMORY CIRCUITS

(71) Applicant: NXP B.V., Eindhoven (NL)

(72) Inventor: Steven Thoen, Leuven (BE)

(73) Assignee: NXP B. V., Eindhoven (NL)

( * ) Notice: Subject to any disclaimer, the term of this patent is extended or adjusted under 35 U.S.C. 154(b) by 42 days.

(21) Appl. No.: 14/535,970

(22) Filed: Nov. 7, 2014

(65) Prior Publication Data

US 2016/0132391 A1 May 12, 2016

(51) Int. Cl.
*G11C 29/00* (2006.01)
*G06F 11/10* (2006.01)
*G06F 1/32* (2006.01)

(52) U.S. Cl.
CPC ........ *G06F 11/1076* (2013.01); *G06F 1/3296* (2013.01); *G06F 11/106* (2013.01)

(58) Field of Classification Search
None
See application file for complete search history.

(56) References Cited

U.S. PATENT DOCUMENTS

| | | | | |
|---|---|---|---|---|
| 5,134,616 A * | 7/1992 | Barth, Jr. | ............... | G11C 29/84 714/710 |
| 5,313,425 A * | 5/1994 | Lee | ........................ | G11C 29/88 365/201 |
| 6,697,992 B2 * | 2/2004 | Ito | ....................... | G06F 11/1008 360/47 |
| 2006/0200729 A1 * | 9/2006 | Ito | ....................... | G06F 11/1008 714/763 |
| 2007/0028146 A1 * | 2/2007 | Ruckerbauer | ........ | G11C 7/1051 714/42 |
| 2008/0201626 A1 * | 8/2008 | Sturm | ................. | G06F 11/1052 714/763 |
| 2008/0222483 A1 | 9/2008 | Ito et al. | | |
| 2010/0146368 A1 | 6/2010 | Chishti et al. | | |
| 2010/0269004 A1 * | 10/2010 | Flynn | .................. | G06F 11/2236 714/746 |

(Continued)

FOREIGN PATENT DOCUMENTS

EP    2560074 A1    2/2013

OTHER PUBLICATIONS

Serbetli S., "Doppler Compensation for Mobile OFDM Systems with Multiple Receive Antennas". IEEE 2012.

(Continued)

*Primary Examiner* — M. Mujtaba Chaudry (57) ABSTRACT

Aspects of the present disclosure are directed to circuits, apparatuses and methods for operating volatile memory circuits. According to an example embodiment, an apparatus includes a volatile memory circuit and a control circuit coupled to the volatile memory circuit. The control circuit is configured to generate and store parity data for data blocks written to the volatile memory circuit. The control circuit places the volatile memory circuit in a sleep mode in response to a first control signal. In response to a second control signal, the control circuit places the volatile memory into an active mode. In further response to the second control signal the control circuit detects and corrects errors in the data blocks stored in the volatile memory using the stored parity data.

19 Claims, 5 Drawing Sheets

(56) References Cited

U.S. PATENT DOCUMENTS

2014/0156924 A1* 6/2014 Jeon ................. G11C 5/148
　　　　　　　　　　　　　　　　　　　　711/108

OTHER PUBLICATIONS

A. Nourivand et al., "Aggressive Leakage Reduction of SRAMs Using Error Checking and Correcting (ECC) Techniques". IEEE 2008.
H. Qin, "Deep Sub-Micron SRAM Design for Ultra-Low Leakage Standby Operation". Technical Report No. UCB/EECS-2007-74, http://www.eecs.berkeley.edu/Pubs/TechRpts/2007/EECS-2007-74.html.
"ECC memory", Wikipedia http://en.wikipedia.org/wiki/ECC_memory pp. 1-7, Aug. 7, 2014.

* cited by examiner

SLEEP MODE OPERATION FOR VOLATILE MEMORY CIRCUITS

Aspects of various embodiments generally related to volatile memory circuits.

Power consumption is increasingly becoming a design consideration for many application, especially those involving battery operated devices. Some approaches to reduce power consumption operate circuits in a sleep or standby mode when idle, in which a power supply provided to the circuits is reduced or disconnected from the circuits. By removing or reducing the power supply, leakage current of the idle circuits can be reduced. However, systems including volatile memory may have to maintain the state of data stored in volatile memory circuits when operated in a sleep mode. Volatile memory circuits are used in various applications for storage of data. Volatile memory circuits, such as SRAM cells, retain data values stored while power is applied to the memory circuits but do not maintain stored data values when power is disconnected from the memory circuit. These and other matters have presented challenges for a variety of applications utilizing volatile memory circuits.

Various example embodiments are directed to circuits, apparatuses and methods for operating volatile memory circuits. According to an example embodiment, an apparatus includes a volatile memory circuit and a control circuit coupled to the volatile memory circuit. The control circuit is configured to generate and store parity data for data blocks written to the volatile memory circuit. The control circuit places the volatile memory circuit in a sleep mode in response to a first control signal. In the sleep mode, a supply voltage for the volatile memory is set to a first voltage, at which data blocks stored in the volatile memory circuit are subject to the introduction of errors. In response to a second control signal, the control circuit places the volatile memory into an active mode. In further response to the second control signal the control circuit detects and corrects errors in the data blocks stored in the volatile memory using the stored parity data.

Another example embodiment provides a method for operating a volatile memory. Parity data is generated and stored for data blocks written to a volatile memory circuit. The volatile memory circuit is placed in a sleep mode in response to a first control signal. The volatile memory is placed into an active mode in response to a second control signal. In further response to the second control signal, errors in the data blocks are detected and corrected using the stored parity data.

In another example embodiment, an apparatus includes a volatile memory circuit. The apparatus also includes a circuit means for generating and storing parity data for data blocks written to the volatile memory circuit, for placing the volatile memory circuit in a sleep mode in response to a first control signal, for placing the volatile memory into an active mode in response to a second control signal, and for detecting and correcting errors in the data blocks using the stored parity data in further response to the second control signal.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving volatile memory circuits. Some aspects are particularly applicable to apparatuses, systems and methods having a sleep mode for reduced power consumption. While not necessarily so limited, various aspects may be appreciated through a discussion of examples using this context.

Volatile memory circuits such as SRAM require a certain threshold supply voltage to prevent the introduction of errors beyond a maximum number that can be handled by the volatile memory circuits in an active mode. The number of errors introduced increases as the supply voltage is decreased. Various embodiments utilize forward error correction (FEC) codes to facilitate recovery of a number of errors, when waking from a sleep mode, that is larger than the maximum can be handled by the memory circuits in the active mode. The ability to recover from a larger number of errors allows a supply voltage for the volatile memory circuit to be further reduced in the sleep mode while maintaining the ability to recover from errors that may be introduced.

FEC codes generate redundant data, referred to as parity data, for data blocks prior to storage or transmission. After transmission or storage of a data block, the FEC code uses the parity data to detect and/or recover errors present in the data block. Some example FEC codes include Hamming, Bose-Chaudhuri-Hochquenghem (BCH), Reed-Solomon, Trellis, and/or convolutional codes. Some error correction techniques use a combination of two or more FEC codes to increase the number of errors that can be recovered. One example combination, specified in ITU-T G.975.1 I.4, implements a concatenation of Reed-Solomon and BCH encoding schemes.

In some embodiments, an apparatus includes a volatile memory circuit and a control circuit coupled to the volatile memory circuit. The control circuit is configured to generate and store parity data for data blocks written to the volatile memory circuit. The control circuit reduces a supply voltage provided to the volatile memory circuit, in response to a first control signal, to place the volatile memory circuit in a sleep mode. The control circuit increases a supply voltage provided to the volatile memory circuit, in response to a second control signal, to place the volatile memory circuit in an active mode. In further response to the second control signal the control circuit detects and corrects errors in the data blocks stored in the volatile memory using the stored parity data.

In some applications, FEC may also be used to prevent introduction of errors in the volatile memory circuit when operated in the active mode. For instance, FEC parity data may be generated when a data block is written to the volatile memory and used to correct errors when the data block is read from the volatile memory. However, the generating of FEC parity data and the recovery from errors takes a certain amount of processing time to be performed. Generally speaking, the processing time required for encoding and decoding operations increases as the number of parity bits used by the error correction code (and the number of errors that can be corrected) is increased. As applications often require memories to exhibit low latency for read times, the processing time needed for recovery for a large number of errors using FEC may be prohibitive.

In some embodiments, a control circuit is configured to use a lower-latency low-error-rate FEC code when the volatile memory is operated in the active mode and a higher-latency high-error-rate FEC code when the volatile memory is operated in the sleep mode. The high-error-rate FEC code allows for recover from a larger number of errors introduced while operating the volatile memory in the sleep mode at the expense of increased latency. However, from user perspective, a certain amount of latency is generally expected and tolerated as a one-time expense when waking from the sleep mode and restoring the state of a system. By using the higher-latency high-error-rate FEC code in the sleep mode, a supply voltage for the volatile memory may be reduced in the sleep mode in comparison to a supply voltage required for operation in the active mode.

Various FEC codes may be used to correct errors induced in the sleep and/or active modes. In some implementations, the lower-latency low-error-rate FEC code may recover from errors using a subset of the parity data used by the higher-latency high-error-rate FEC code. For example, the two FEC codes may use the same encoding algorithm with a different number of parity bits. As another example, the higher-latency high-error-rate FEC code may include a concatenation of two FEC codes (e.g., Reed-Solomon and BCH) with separate sets of parity data generated for each of the two FEC codes. The lower-latency low-error-rate FEC code may perform error correction using parity data for one of the two concatenated FEC codes. In some other implementations, the lower-latency low-error-rate FEC code and the higher-latency high-error-rate FEC code use mutually exclusive sets of parity data. The parity data for the FEC code(s) may be stored in the volatile memory or may be stored in a separate volatile or non-volatile memory In some embodiments, the control circuit may reduce a supply voltage, when operated in the sleep mode, below that required by the volatile memory to prevent errors from being introduced. For example, when operating the volatile memory in the active mode, the control circuit may set the supply voltage for the volatile memory to a first voltage sufficient to prevent errors from being introduced in data stored by the volatile memory. When operating the volatile memory in the sleep mode, the control circuit may reduce the supply voltage to a second lower voltage at which errors may be introduced in the data stored by the volatile memory circuit.

Different embodiment may utilize various circuits to adjust the voltage source provided to the volatile memory. In one embodiment, the apparatus may include a selection circuit configured to connect a selected one of a plurality of voltage sources to volatile memory. The selected one of the voltage sources may be indicated by, for example, a control signal output from control circuit. In another embodiment, the control circuit may be configured to adjust a voltage output by a programmable voltage source connected to the volatile memory circuits.

In some implementations, the control circuit may set the voltage source for the sleep mode to a fixed voltage level indicated by a value stored in the non-volatile memory. In some other embodiments, the control circuit may dynamically adjust the voltage level of the voltage source based on the rate at which errors are detected. For instance, the control circuit may determine a voltage level for the sleep mode based on a number of errors previously detected when awakening from the sleep mode and a maximum number of errors that can be recovered by the FEC code.

Figure 1:
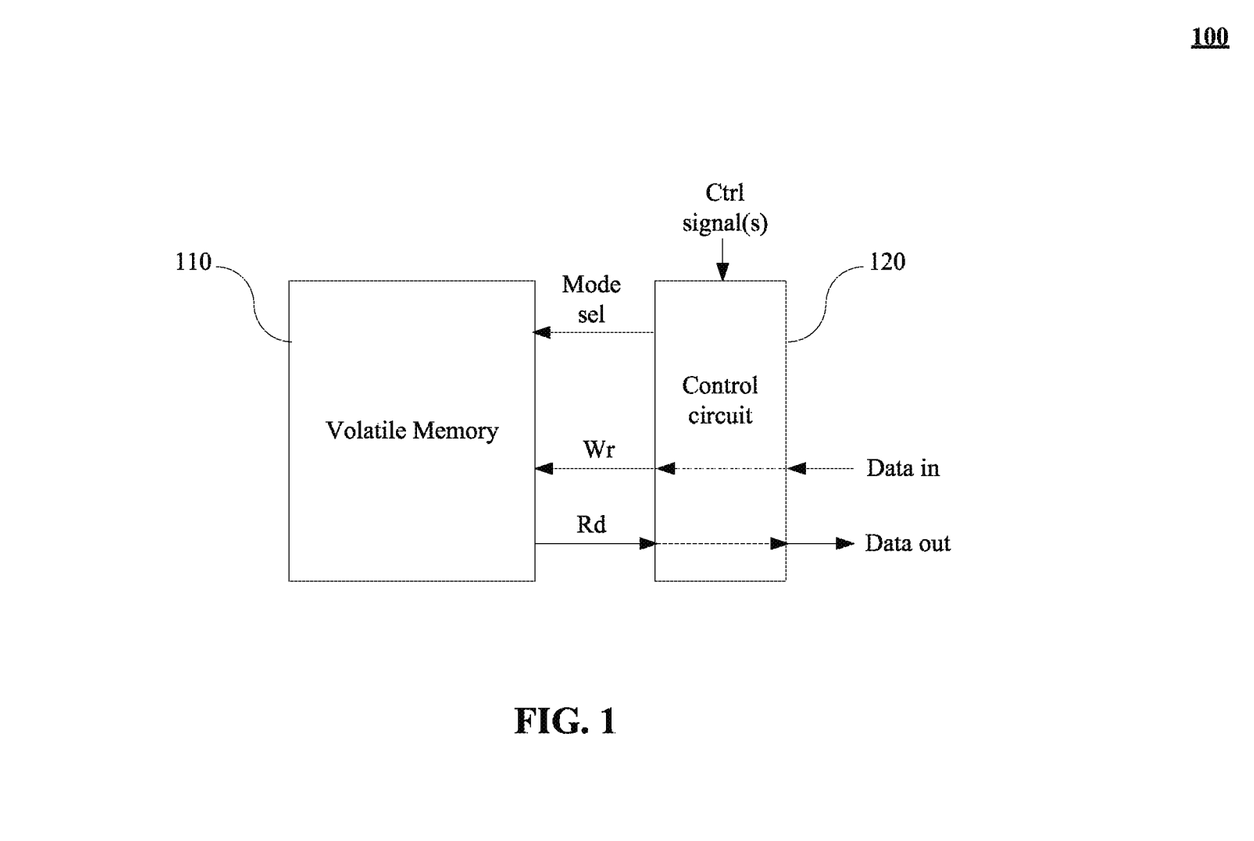
FIG. 1 shows a block diagram of a first device having a volatile memory and control circuit, consistent with one or more embodiments.

Turning now to the figures, FIG. 1 shows a block diagram of a first device having a volatile memory and control circuit, consistent with one or more embodiments. The device 100 includes a volatile memory circuit 110 and a control circuit 120 coupled to the volatile memory circuit. The control circuit 120 may include, for example, programmed or semi-programmed logic circuitry configured to provide FEC protection of data stored by the volatile memory circuit 110, by performing a process that includes generating and storing parity data for data blocks written to the volatile memory circuit. The process further places the volatile memory circuit 110 in a sleep mode in response to a first control signal. In the sleep mode, a supply voltage used to power the volatile memory is set to a voltage at which data blocks stored in the volatile memory circuit 110 are subject to an introduction of errors. The process performed by the control circuit 120 wakes the volatile memory circuit 110 from the sleep mode to place the circuit into an active mode in response to a second control signal. In further response to the second control signal, the process performed by the control circuit 120 corrects errors in the data blocks stored in the volatile memory using the stored parity data. In this manner the device recovers errors that may have occurred while the non-volatile memory circuit 110 is operated in the sleep mode.

Figure 2:
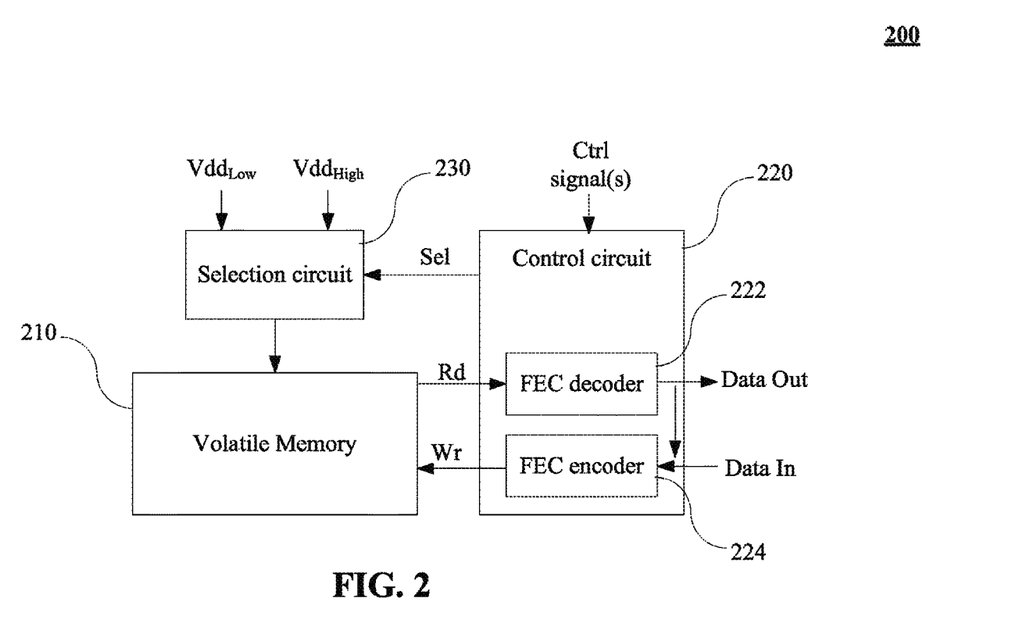
FIG. 2 shows a block diagram of a second device having a volatile memory and control circuit, consistent with one or more embodiments.

FIG. 2 shows a block diagram of a second device having a volatile memory and control circuit, consistent with one or more embodiments. The device 200 includes a volatile memory circuit 210 and a control circuit 220 coupled to the volatile memory circuit. The control circuit 220 may include, for example, programmed or semi-programmed logic circuitry configured to provide FEC protection of data stored by the volatile memory circuit 210, by performing a process that includes generating and storing parity data for data blocks written to the volatile memory circuit. The process further places the volatile memory circuit 210 in a sleep mode in response to a first control signal. In the sleep mode, a supply voltage used to power the volatile memory is set to a voltage at which data blocks stored in the volatile memory circuit 210 are subject to an introduction of errors. The process performed by the control circuit 220 wakes the volatile memory circuit 210 from the sleep mode to place the circuit into an active mode in response to a second control signal. In further response to the second control signal, the process performed by the control circuit 220 corrects errors in the data blocks stored in the volatile memory using the stored parity data.

In this example, the control circuit 220 places the volatile memory circuit 210 in the sleep mode by causing a lower supply voltage ($Vdd_{Low}$) to be provided to the volatile memory circuit 210. Conversely, the control circuit 220 places the volatile memory circuit 210 in the active mode by causing a higher supply voltage ($Vdd_{High}$) to be provided to the volatile memory circuit 210, where $Vdd_{High}$>$Vdd_{Low}$.

When the volatile memory circuit is operated at the voltage of the lower supply voltage data blocks stored in the volatile memory circuit are subject to an introduction of errors. As previously discussed, the lower supply voltage provided to the volatile memory circuit 210 in the sleep mode may be a voltage level at which the number of errors that are induced is greater than can be handled by the volatile memory circuit 210 in the active mode. In this example, the device 200 includes a selection circuit 230 configured to connect one of the voltage sources ($Vdd_{High}$ and $Vdd_{Low}$), indicated by a selection signal (Sel), to a power supply terminal of the volatile memory circuit 210. The Sel is adjusted by the control circuit 220 to place the volatile memory circuit 210 in either the active mode or the sleep mode. For instance, in some implementations, logic circuitry (e.g., for example programmed or semi-programmed logic circuitry) in the control circuit 220 may set the Sel signal to a first binary value (e.g., logic 0)—thereby directing the selection circuit 230 to provide $Vdd_{Low}$ to the volatile memory circuit 210. Conversely, the logic circuitry in the control circuit 220 may set the Sel signal to a second binary value (e.g., logic 1)—thereby directing the selection circuit 230 to provide $Vdd_{High}$ to the volatile memory circuit 210.

The selection circuit 230 may be implemented with various circuit arrangements. As one example, the selection circuit may include respective transistors to couple a respective supply voltage to a power supply terminal of the volatile memory circuit 210, in response to the Sel signal. For instance, the selection circuit 230 may include an n-type transistor having a source terminal coupled to $Vdd_{High}$, a drain terminal coupled to the power supply terminal of the volatile memory circuit 210, and a gate terminal coupled to receive the Sel signal. The selection circuit 230 may include an p-type transistor having a source terminal coupled to $Vdd_{Low}$, a drain terminal coupled to the power supply terminal of the volatile memory circuit 210, and a gate terminal coupled to receive the Sel signal. When Sel is set to logic 1, the n-type transistor connects $Vdd_{High}$ to the power supply terminal and the p-type transistor disconnects $Vdd_{Low}$ from the power supply terminal. Conversely, when Sel is set to logic 0, the n-type transistor disconnects $Vdd_{High}$ from the power supply terminal and the p-type transistor connects $Vdd_{Low}$ to the power supply terminal.

In some other embodiments, the control circuit may be configured adjust a voltage output by a programmable voltage source connected to the volatile memory circuits. Logic circuitry (e.g., a programmed processor) in the control circuit 220 may specify a voltage value in the Sel signal provided to the programmable voltage source—thereby directing the programmable voltage source to provide the specified voltage to the volatile memory circuit 210. For instance, logic circuitry of the control circuit may place the volatile memory circuit 210 in the sleep mode by setting the output signal Sel to specify the lower-voltage level. Conversely, logic circuitry of the control circuit 220 may place the volatile memory circuit 210 in the active mode by setting the output signal Sel to specify the higher-voltage level.

The control circuit 220 is configured to generate and store FEC parity data for data blocks written to the volatile memory circuit 210. The FEC parity data is used to correct errors in the volatile memory when it is placed back into the active mode from the sleep mode. For instance, in response to the second control signal, the control circuit may check each data block stored in the volatile memory 210 using the parity data previously generated by the control circuit 220 for the data block.

In this example, the control circuit 220 includes an FEC encoder 222 configured to generate FEC parity data for each data block written to the volatile memory circuit 210. The control circuit 220 also includes an FEC decoder 224 configured to detect and correct errors in data blocks retrieved from the volatile memory circuit 210 using the parity data previously generated for the data block by the FEC encoder 222. The FEC parity data may be stored in the volatile memory circuit 210 or may be stored in a different memory (e.g., that may be included in the control circuit 220).

As previously indicated, the control circuit 220 is configured to correct errors in the volatile memory using the FEC parity data when it is placed into the active mode from the sleep mode. In some applications, FEC may also be used to correct a limited number of errors in the volatile memory circuit in the active mode. For instance, the control circuit 220 may use a lower-latency lower-error-rate FEC code to correct errors incurred while the non-volatile memory is in the active mode. The control circuit 220 may use a higher-latency high-error-rate FEC code to correct errors incurred while the volatile memory 210 is in the sleep mode. The control circuit 220, may utilize various FEC codes along or in combination to correct errors induced while the volatile memory 210 is operated in the sleep and/or active modes.

Figure 3:
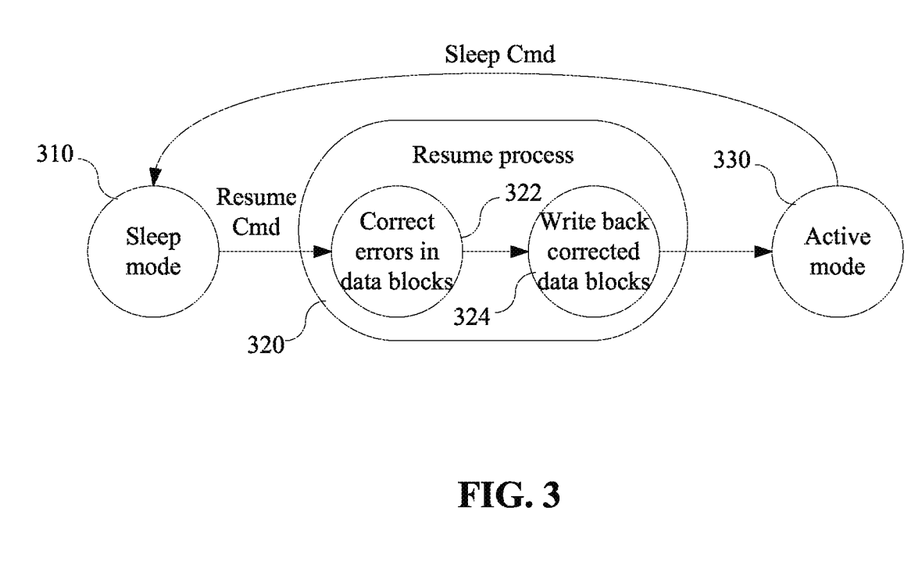
FIG. 3 shows a state machine that may be used by a control circuit for a volatile memory, consistent with one or more embodiments.

FIG. 3 shows a state machine that may be used by a control circuit for a volatile memory. In state 330, the volatile memory is operated in an active mode, as described with reference to FIGS. 1 and 2. In response to a sleep command, the state machine transitions to state 310, where the volatile memory is operated in a sleep mode, as described with reference to FIGS. 1 and 2. In response to a resume command, the state machine transfers to state 320, where a set of resume processes are performed. In this example, the resume processes correct errors in data block stored in the volatile memory at sub-state 322 and write corrected data blocks back to the volatile memory at sub-state 324. After completing the resume process at state 320 the state machine transitions back to state 330 and the volatile memory is again operated in the active mode.

As previously indicated, different embodiment may use various techniques to adjust the supply voltage provided to the volatile memory in the sleep mode. For example, some embodiments may set the supply voltage to a fixed voltage level (e.g., indicated in a non-volatile memory). Some other embodiments, may dynamically adjust the sleep mode supply voltage based on the error rate exhibited by the volatile memory for previous supply voltages.

Figure 4:
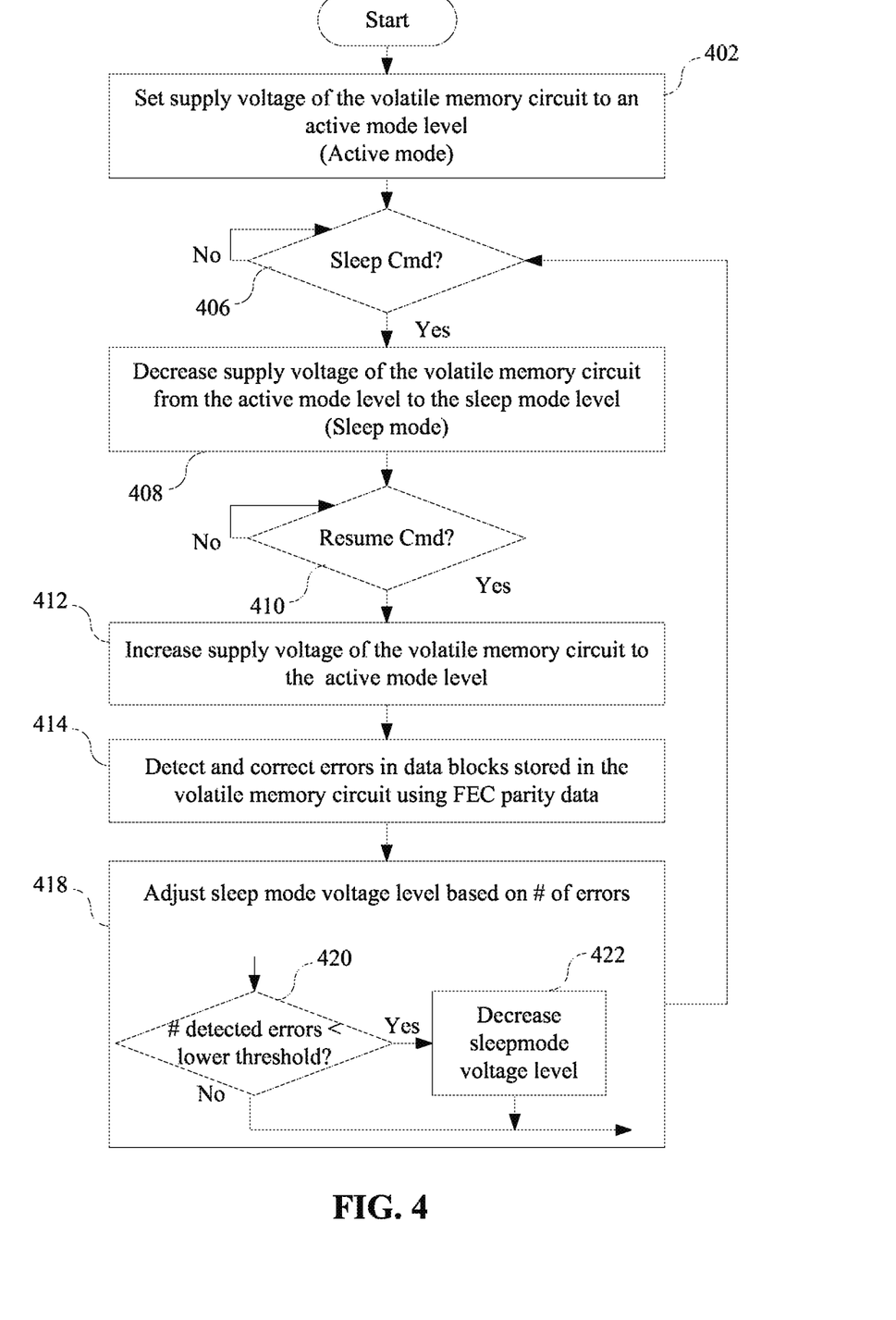
FIG. 4 shows a process for operating a volatile memory, consistent with one or more embodiments.

FIG. 4 shows a process for operating a volatile memory that dynamically determines a supply voltage level for sleep mode operation, consistent with one or more embodiments. At block 402, a supply voltage provided to the volatile memory is set to an active mode level to place the non-volatile memory in an active mode. In some implementations, the active mode level is specified in a non-volatile memory. In some other implementations, the active mode level may correspond to a highest level provided by a programmable voltage supply.

The non-volatile memory operates in the active mode, until a sleep command is received at decision block 406. Once a sleep command is received, decision block 406 directs the process to block 408. At block 408, the supply voltage provided to the memory circuit is decreased to a sleep mode level to place the non-volatile memory in a sleep mode. The non-volatile memory operates in the sleep mode, until a resume command is received at decision block 410. Once the resume command is received, decision block 410 directs the process to block 412.

At block 412, the supply voltage provided to the volatile memory is increased back to the active mode level to place the non-volatile memory back in an active mode. At block 414, errors in data blocks stored in the volatile memory are detected and corrected using FEC parity data. At block 418, sleep mode voltage level is adjusted based on the number of error detected in the volatile memory. In this example, if the number of detected errors is less than a lower threshold, decision block 420 directs the process to decrease the sleep mode voltage level at block 422. Lowering the sleep mode voltage level allows power consumption in the sleep mode to be reduced until the number of induced errors nears that maximum number of errors that may be corrected using the FEC parity data. In some embodiments, the adjustment at block 418 may be configured to also increase the sleep mode voltage level if the number of detected errors exceeds an upper threshold. Use of the upper threshold may be useful to prevent changing environmental conditions from causing the number of errors to exceed the maximum number of errors that may be corrected using FEC the parity data.

Figure 5:
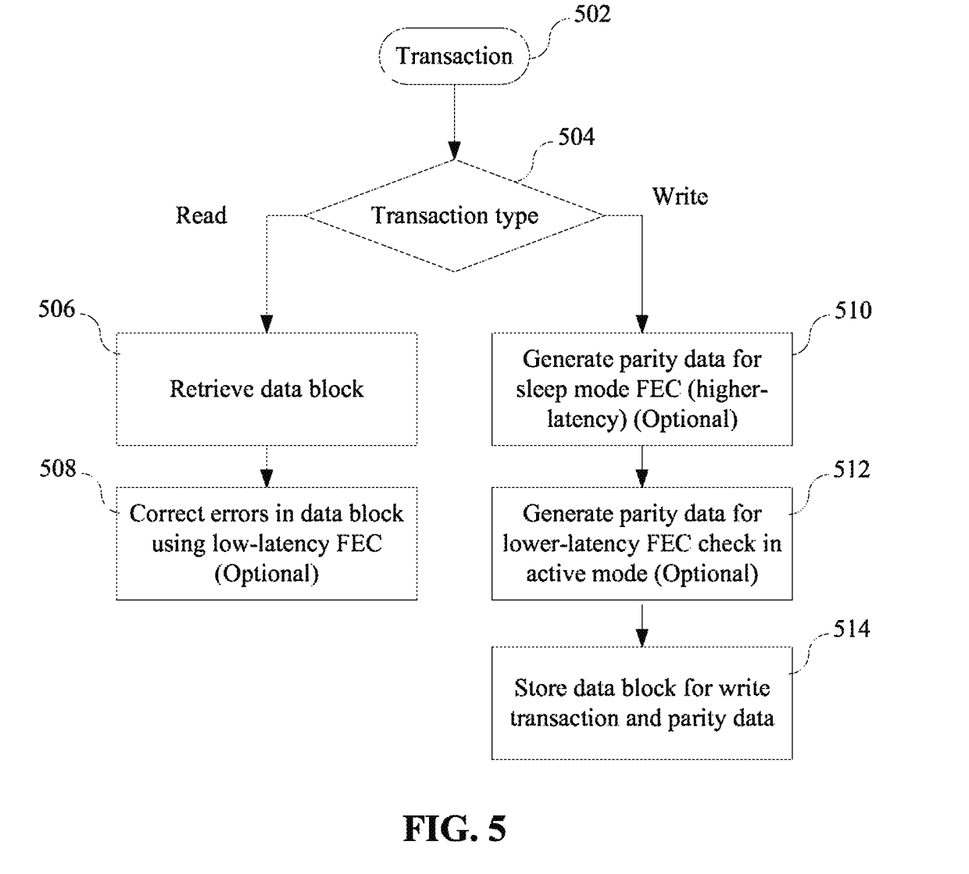
FIG. 5 shows a process for operating a volatile memory in an active mode, consistent with one or more embodiments.

FIG. 5 shows a process for operating a volatile memory in an active mode, consistent with one or more embodiments. The process may be performed, for example, by control circuit 120 and 220 in FIGS. 1 and 2 while the volatile memory circuits are operated in the active mode. The process starts when a transaction 502 is initiated. If the transaction is a write transaction, decision block 504 directs the process to block 510. At block 510, parity data is generated for a higher-latency FEC code used to correct errors induced while the volatile memory is operating in sleep mode 510. Alternatively, in some embodiments, block 510 may be omitted in the active mode process, and parity data may instead be generated for all data blocks just before the volatile memory is placed into the sleep mode.

Optionally, if FEC is performed in the active mode, parity data may be generated for a lower-latency FEC code at block 512. However, as previously described, in some implementations, the lower-latency FEC code may use a subset of parity data generated for the higher-latency FEC code at block 510. In such case, it may not be necessary to generate additional parity data at block 512. At block 514, the data block for the write transaction and parity data is stored in one or more memories. The parity data may be stored along with the data block in the volatile memory or may be stored in a separate memory. If the transaction 502 is a read transaction, decision block 504 directs the process to decision block 506. At block 506, the data block indicated by the transaction 502 is retrieved from the volatile memory. Optionally at block 508, errors may be corrected in the retrieved data block using the lower-latency FEC code.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., generation of parity data, or FEC). For example, in certain of the above-discussed embodiments, one or more modules are discrete logic circuits or programmable logic circuits configured and arranged for implementing these operations/activities, as in the circuit modules shown in FIGS. 1 and 2. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For instance, although implementations may in some cases be described in individual figures, it will be appreciated that features from one figure can be combined with features from another figure even though the combination is not explicitly shown or explicitly described as a combination. Such modifications do not depart from the true spirit and scope of various aspects of the invention, including aspects set forth in the claims.

What is claimed is:

1. An apparatus, comprising:
a volatile memory circuit; and
a control circuit configured to control a sleep mode and an active mode, wherein the control circuit is arranged to:
generate and store parity data for data blocks written to the volatile memory circuit;
in response to a first control signal, place the volatile memory circuit in the sleep mode, in which a supply voltage for the volatile memory is set to a first voltage at which data blocks stored in the volatile memory circuit are subject to an introduction of errors; and
in response to a second control signal,
place the volatile memory into the active mode, and detect and correct errors in the data blocks stored in the volatile memory using the stored parity data including:
using a first error correction code to correct errors introduced in response to the data blocks being written; and
using a second error correction code that is different than the first error correction code to correct errors introduced during the sleep mode, wherein the volatile memory circuit is placed into the active mode by setting the supply voltage for the volatile memory circuit to a second voltage sufficient to prevent errors from being introduced in data stored by the volatile memory circuit, the first voltage being lower than the second voltage and wherein the second error correction code includes a different latency and error rate than the first error correction code.

2. The apparatus of claim 1, wherein placing of the volatile memory circuit into the active mode includes setting the supply voltage to a second voltage that is greater than the first voltage and that is sufficient to prevent errors from being introduced in data blocks stored by the volatile memory circuit.

3. The apparatus of claim 1, further comprising, a selection circuit configured to connect a select one of a plurality of voltage sources, that is indicated by a control signal, to a supply terminal of the volatile memory circuit.

4. The apparatus of claim 1, wherein
the parity data is configured to correct up to a first number of errors in each data block stored in the volatile memory circuit; and
a second number of errors being less the first number of errors, wherein the second number of errors are expected to be introduced in data stored by the volatile memory circuit when the supply voltage is set to the first voltage.

5. The apparatus of claim 1, further comprising a non-volatile memory, and wherein the setting of the supply voltage to the first voltage sets the supply voltage to a level indicated in a value stored in the non-volatile memory.

6. The apparatus of claim 5, wherein the control circuit is further configured and arranged to, in response to a number of errors detected in response to the second control signal being less than a first threshold value, decreasing the value stored in the non-volatile memory.

7. The apparatus of claim 6, wherein the control circuit is further configured and arranged to, in response to the number of errors detected in response to the second control signal being greater than a second threshold value, increasing the value stored in the non-volatile memory.

8. The apparatus of claim 1, wherein the parity data is stored in the volatile memory circuit, wherein the first error correction code includes a subset of the parity data used by the second error correction code.

9. The apparatus of claim 1, further comprising a second memory circuit; and wherein the control circuit is configured to store the parity data in the second memory circuit, wherein the second error correction code includes a concatenation of two forward error correction (FEC) codes.

10. The apparatus of claim 1, wherein the control circuit is further configured to, in response to a data block being read from the volatile memory circuit in the active mode, detect and recover from errors in the data block using the parity data, wherein the control circuit is configured to generate separate sets of parity data using the first and second error correction codes.

11. The apparatus of claim 10, wherein:
the detection and recovery of errors by the control circuit in response to the data block being read is performed using the first error correction code configured to correct up to a first number of errors; and
the detection and recovery of errors by the control circuit in response to the second control signal is performed using the second error correction code that is different than the first error correction code and that is configured to correct up to a second number of errors that is greater than the first number of errors.

12. The apparatus of claim 11, wherein the placing of the volatile memory into the active mode includes setting the supply voltage to a second voltage that is greater than the first voltage and that is sufficient to prevent more than the first number of errors from being introduced in data blocks stored by the volatile memory.

13. The apparatus of claim 11, wherein:
the second error correction code uses a first number bits of the parity data for detection and recovery of errors of a data block stored in the volatile memory circuit; and
the first error correction code uses a subset of the first number of bits for detection and recovery of errors of the data block.

14. The apparatus of claim 13, wherein
the second error correction code is concatenated code including Reed-Solomon correction code and BCH correction code; and
the first error correction code is one of Reed-Solomon correction code or BCH correction code.

15. A method, comprising:
generating and storing parity data for data blocks written to a volatile memory circuit;
in response to a first control signal, placing the volatile memory circuit in a sleep mode by setting a supply voltage for the volatile memory circuit to a first voltage at which errors are introduced in the data blocks stored by the volatile memory circuit; and
in response to a second control signal
placing the volatile memory into an active mode by setting the supply voltage for the volatile memory circuit to a second voltage sufficient to prevent errors from being introduced in data stored by the volatile memory circuit, the first voltage being lower than the second voltage, and
detecting and correcting errors in the data blocks stored in the volatile memory using the stored parity data including:
using a first error correction code to correct errors introduced in response to the data blocks being written and
using a second error correction code that is different than the first error correction code to correct errors introduced during the sleep mode, wherein the second error correction code includes a different latency and error rate than the first error correction code.

16. The method of claim 15, wherein
the setting of the supply voltage to the first voltage sets the supply voltage to a level indicated in a value stored in a non-volatile memory; and
further comprising
decreasing the value stored in the non-volatile memory in response to a number of detected errors being less than a first threshold value, and
increasing the value stored in the non-volatile memory in response to the number of detected errors being greater than a second threshold value, increasing the value stored in the non-volatile memory.

17. The method of claim 15, further comprising in response to a data block being read from the volatile memory in the active mode, detecting and recovering from errors in the data block using the parity data.

18. The method of claim 17, wherein
the detection and recovery of errors introduced when the data blocks are written to the volatile memory circuit during the active mode and in response to the data block being read is performed using the first error correction code configured to correct up to a first number of errors; and
the detection and recovery of errors introduced when the volatile memory circuit in the sleep mode and in response to the second control signal is performed using the second error correction code that is different than the first error correction code and configured to correct up to a second number of errors that is greater than the first number of errors.

19. An apparatus, comprising:

a volatile memory circuit; and a circuit configured and arranged to control a sleep mode and an active mode of operation by:
  generating and storing parity data for data blocks written to the volatile memory circuit,
  placing the volatile memory circuit in a sleep mode in response to a first control signal by setting a supply voltage for the volatile memory circuit to a first voltage at which errors are introduced in the data blocks stored by the volatile memory circuit, and
  in response to a second control signal,
    placing the volatile memory into an active mode by setting the supply voltage for the volatile memory circuit to a second voltage sufficient to prevent errors from being introduced in data stored by the volatile memory circuit, the first voltage being lower than the second voltage, and
  detecting and correcting errors in the data blocks stored in the volatile memory using the stored parity, wherein the circuit is further configured and arranged to:
  corrects errors introduced in response to the data blocks being written using a first error correction code and
  corrects errors introduced during the sleep mode using a second error correction code that is different than the first error correction code and that is configured to correct a greater number of errors than the first error correction code, the second error correction code includes a different latency and error rate than the first error correction code.

* * * * *